(12) United States Patent
Clarke

(10) Patent No.: US 9,378,296 B2
(45) Date of Patent: Jun. 28, 2016

(54) VIRTUAL WORLD CONSTRUCTION

(75) Inventor: Michael P. Clarke, Ellenbrook (AU)

(73) Assignee: International Business Machines Corporation, Armonk, NY (US)

(*) Notice: Subject to any disclaimer, the term of this patent is extended or adjusted under 35 U.S.C. 154(b) by 1527 days.

(21) Appl. No.: 12/862,038

(22) Filed: Aug. 24, 2010

(65) Prior Publication Data

US 2012/0050257 A1   Mar. 1, 2012

(51) Int. Cl.
*G06T 17/00* (2006.01)
*G06F 17/30* (2006.01)

(52) U.S. Cl.
CPC .......... *G06F 17/30893* (2013.01); *G06T 17/00* (2013.01)

(58) Field of Classification Search
CPC .............. G06F 17/24; G06F 17/3089; G06F 17/30675; G06F 17/30696; G06F 17/30893; G06F 17/30899; G06F 17/30926; A63F 13/06; A63F 2300/6676; A63F 13/00; A63F 2300/301; A63F 13/10; A63F 13/12; A63F 2300/5533; G06T 17/00
USPC ...................................................... 345/419
See application file for complete search history.

(56) References Cited

U.S. PATENT DOCUMENTS

| | | | | |
|---|---|---|---|---|
| 7,958,010 B2 * | 6/2011 | Huang | ......................... | 705/26.7 |
| 8,595,299 B1 * | 11/2013 | Wang | ................. | H04L 12/1827 463/31 |
| 8,683,386 B2 * | 3/2014 | Shuster | ......................... | 715/848 |

| | | | |
|---|---|---|---|
| 2003/0008712 A1 | 1/2003 | Poulin | |
| 2003/0177187 A1 | 9/2003 | Levine et al. | |
| 2005/0043097 A1* | 2/2005 | March | ..................... A63F 13/12 463/42 |
| 2006/0111188 A1 | 5/2006 | Winkler et al. | |
| 2006/0111189 A1 | 5/2006 | Winkler et al. | |
| 2007/0083617 A1 | 4/2007 | Chakrabarti et al. | |
| 2008/0222295 A1 | 9/2008 | Robinson et al. | |
| 2009/0100035 A1 | 4/2009 | Cradick et al. | |
| 2009/0144638 A1 | 6/2009 | Haggar et al. | |
| 2009/0157853 A1 | 6/2009 | Doi | |
| 2009/0199275 A1 | 8/2009 | Brock et al. | |
| 2009/0225074 A1* | 9/2009 | Bates et al. | ................... 345/419 |
| 2009/0251457 A1 | 10/2009 | Walker et al. | |
| 2009/0262107 A1 | 10/2009 | Castelli et al. | |

(Continued)

FOREIGN PATENT DOCUMENTS

JP        2000172616 A    6/2000
KR       100261272 B1    7/2000

OTHER PUBLICATIONS

U.S. Appl. No. 12/862,004.
Garcia, Tiago et al., "Load Balancing for Distributed Virtual Reality Systems", URL:http://ieeexplore.ieee.org/xpl/freeabs_all.jsp?arnumber=722746, Oct. 1998, 8 pages.

(Continued)

*Primary Examiner* — Gregory J Tryder
*Assistant Examiner* — F. M. Hossain
(74) *Attorney, Agent, or Firm* — Stephen R. Tkacs; Stephen J. Walder, Jr.; Parashos T. Kalaitzis

(57) ABSTRACT

A mechanism is provided for generating a customized virtual world. A set of entities to be rendered within the customized virtual world is identified. An entity is a location within the customized virtual world. A representation associated with a target style for each entity in the set of entities is selected to form a set of selected representations. A customized virtual world is constructed using the set of selected representations. The set of representations are rendered within the customized virtual world.

21 Claims, 9 Drawing Sheets

(56) References Cited

U.S. PATENT DOCUMENTS

| | | |
|---|---|---|
| 2009/0275414 A1 | 11/2009 | Lee et al. |
| 2010/0227688 A1 | 9/2010 | Lee et al. |
| 2010/0283795 A1* | 11/2010 | Deffeyes .................... 345/619 |
| 2011/0210962 A1* | 9/2011 | Horan et al. ................ 345/419 |
| 2011/0320411 A1 | 12/2011 | Henderson |
| 2012/0054217 A1 | 3/2012 | Clarke |

OTHER PUBLICATIONS

Morillo, Pedro et al., "Improving the Performance of Distributed Virtual Environment Systems", URL:http://www.computer.org/portal/web/csdl/doi/10.1109/TDPS.2005.83, IEEE Transactions on Parallel and Distributed Systems, vol. 16, No. 7, Jul. 2005, 13 pages.

Notice of Allowance mailed Jan. 31, 2013 for U.S. Appl. No. 12/862,004; 10 pages.

* cited by examiner

FIG. 5

502 — Shard 1, (free)

506 — Shard 2, "CHILDRENS_WORLD",G,{user1,user2,user3},[group1],{world_ep1,world_ep2,world_ep3,world_ep4}

508 — Shard 3, "ELVIS_PRESLEY",MA,{user4,user5,user6,user7},[group2,group3],{world_ep5,world_ep6,world_ep7}

504 — Shard 4, (free)

FIG. 7

SET OF PREFERRED REPRESENTATIONS 700

| STYLE | RATING | | |
|---|---|---|---|
| | G 702 | PG 704 | MA 708 |
| SNOW | REPRESENTATION | REPRESENTATION | REPRESENTATION 712 |
| ICY WASTE | REPRESENTATION | REPRESENTATION 706 710 | |
| MOUNTAIN | REPRESENTATION 714 | REPRESENTATION 716 | REPRESENTATION |
| WINTER FOREST | REPRESENTATION | REPRESENTATION | |

VIRTUAL WORLD CONSTRUCTION

BACKGROUND OF THE INVENTION

1. Field of the Invention

The present invention is related generally to a data processing system and in particular to a method and apparatus for automatic virtual world construction. More particularly, the present invention is directed to a computer implemented method, apparatus, and computer usable program code for dynamically generating a customized virtual world responsive to a query.

2. Description of the Related Art

A virtual world, also referred to as a virtual universe, metaverse, or "3D Internet", is a computer-based simulated environment hosted on a server over the Internet. Examples of virtual universes include, without limitation, Second Life™, Entropia Universe®, The Sims Online™, EverQuest™, Ultima Online™, Lineage™, and World of Warcraft™. Virtual worlds are typically represented using three-dimensional (3-D) graphics and landscapes.

Virtual worlds are multiuser environments. Thousands of users may populate a virtual world simultaneously. When a virtual world server becomes too busy due to the number of users accessing a virtual world hosted on the server, the virtual world server may be able to spawn a copy of that virtual world on a second server. This copy of the virtual world on the second server is referred to herein as a "shard". The virtual world server may then transfer some of the users of the virtual world to the shard on the second server. Typically the number of servers and the maximum number of shards that may be made available to users is fixed.

SUMMARY OF THE INVENTION

The illustrative embodiments provide a computer implemented method, apparatus, and computer program product for constructing a customized virtual world. In one embodiment, a set of entities to be rendered within the customized virtual world is identified. An entity is a location within the customized virtual world. A representation associated with a target style for each entity in the set of entities is selected to form a set of selected representations. A customized virtual world is constructed using the set of selected representations. The set of representations are rendered within the customized virtual world.

In still another embodiment, a customized virtual world having a set of portals responsive to a query is received. A set of client virtual world software platforms installed at a data processing system associated with a user is identified to form a set of available client platforms. The customized virtual world is rendered with the set of portals on a display device. Each portal in the set of portals associated with a platform in the set of available client platforms is activated. Each portal in the set of portals associated with a platform that is absent from the set of available client platforms is inactivated.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a diagram of a set of entries in a shard database in accordance with an illustrative embodiment;

FIG. 7 is a chart of a set of preferred representations and ratings in accordance with an illustrative embodiment;

DETAILED DESCRIPTION OF THE PREFERRED EMBODIMENT

Figure 1:
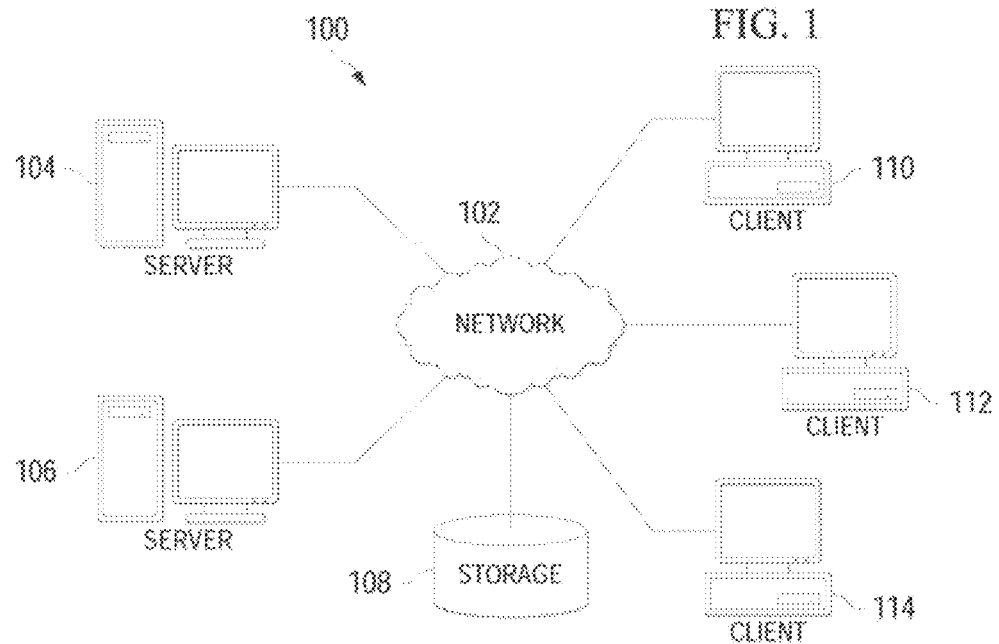
FIG. 1 is a pictorial representation of a network of data processing systems in which illustrative embodiments may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
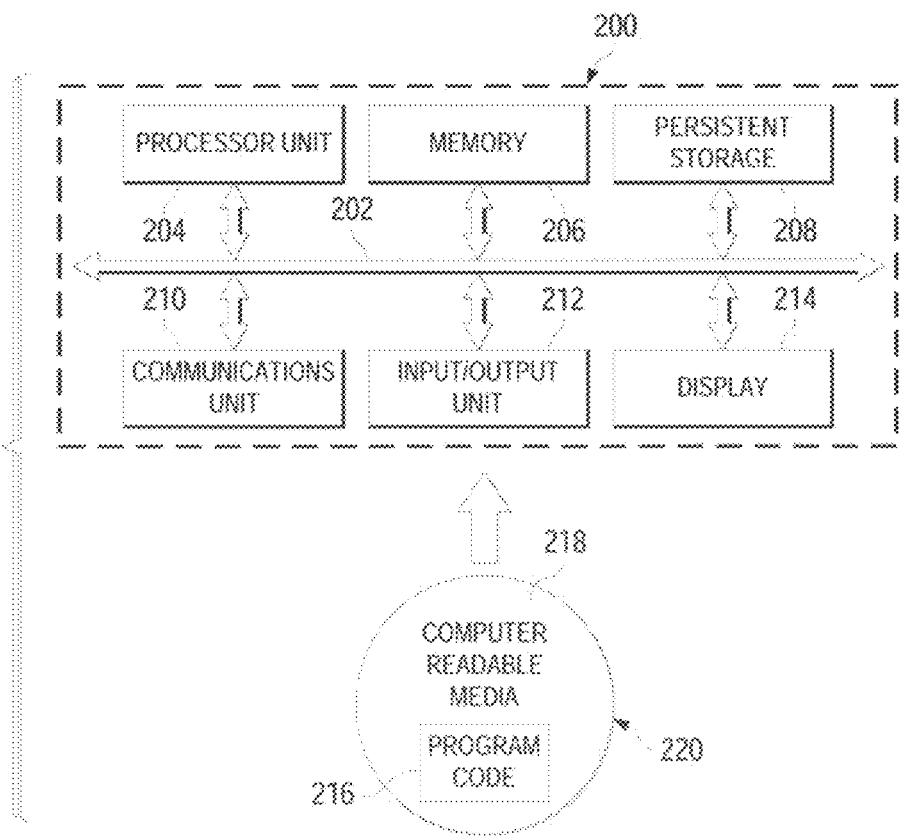
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

Program code located in network data processing system 100 may be stored on a computer recordable storage medium and downloaded to a data processing system or other device for use. For example, program code may be stored on a computer recordable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multiprocessor core, depending on the particular implementation.

Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 216 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 216 may be a server computer, a client computer, or some other device capable of storing and transmitting program code 216.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The embodiments recognize that when a user immersed within the environment of a first virtual world wants to navigate to a different second virtual world web site, the user leaves the immersion of the first virtual world to navigate to the second virtual world. The illustrative embodiments recognize that there is a need for a query response system with the ability to generate a customized virtual world having portals that are running on different software virtual world platforms. As used herein, a portal is a virtual world representation of an entry point in a customized virtual world. A user may leave the customized virtual world and navigate to a different second virtual world by using an avatar representing the user to interact with a portal within the customized virtual world that represents an entry point to the second virtual world.

Therefore, the illustrative embodiments provide a computer implemented method, apparatus, and computer program product for dynamically constructing a customized virtual world. In one embodiment, a set of entities to be rendered within the customized virtual world is identified. The set of entities is a set of one or more entities. An entity is a location or place to be contained within the virtual world. An entity may include any object that is to be rendered within the customized virtual world, such as, but without limitation, a portal, an avatar, a building, a street, a sign, a bot, an advertisement, a banner, or any other object rendered within the virtual world.

In one embodiment, but without limitation, the set of entities includes a set of portals. A portal is an object or set of objects representing an entry point to an alternate virtual world. When a user's avatar interacts with a portal, the portal may cause the user's avatar to be transported to an alternate virtual world that is a different virtual world than the customized virtual world.

In this example, the alternate virtual world contains subject matter and/or content that is responsive to a user's query. However, the portals are not required to lead to virtual worlds having content responsive to a query. A portal may lead to any different virtual world. Thus, when an avatar interacts with a portal in a virtual world, the portals links to a predetermined location in a different virtual world and sends the avatar to that predetermined location.

The set of portals is a set of one or more portals. In one embodiment, every entity in the set of entities may have one or more portals. In another embodiment, only a single entity may have a portal. In still another example, two or more entities may have one or more portals with one or more entities having no portals. For example, a server constructing a plaza themed world to hold the response to a query may include entities that are represented as fountains and statues, without any portals. These entities without portals may serve to space out the representations of entities that do have portals and to reinforce the visual theme of the customized virtual world that is created in response to the user's query.

A representation associated with a target style for each entity in the set of entities is selected to form a set of selected representations. A customized virtual world is constructed using the set of selected representations. The set of representations are rendered within the customized virtual world. In other words, the representations of the entities in the set of entities are rendered within the customized virtual world.

In still another embodiment, a customized virtual world having a set of portals responsive to a query is received. A set of client virtual world software platforms installed at a data processing system associated with a user is identified to form a set of available client platforms.

A client virtual world software platform is an alternate virtual world client software installed on the client data processing system that is utilized by a user to access a virtual world hosted on a server. Different virtual worlds may require different client virtual world software platforms on the client before the client can access the virtual world(s). In other words, a first virtual world may require a completely different client virtual world software platform at a different level than a second virtual world. If a client data processing system does not have a virtual world software platform at the correct level for a given virtual world, the client data processing system may be unable to connect to that given virtual world.

The customized virtual world is rendered with the set of portals on a display device. Each portal in the set of portals associated with a platform in the set of available client platforms is activated. Each portal in the set of portals associated with a platform that is absent from the set of available client platforms is inactivated.

Figure 3:
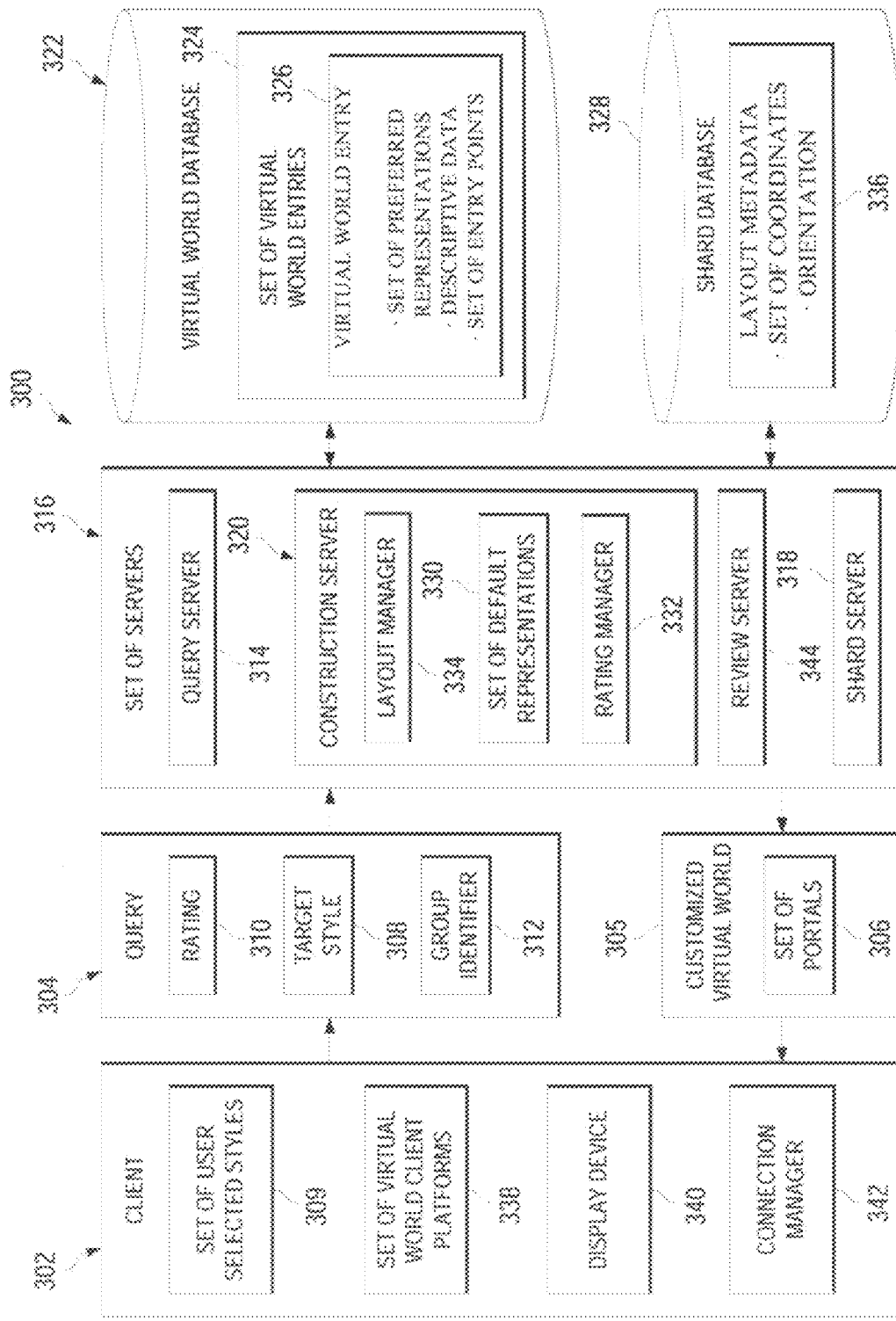
FIG. 3 is a block diagram of a virtual world query response system for generating customized virtual world query responses in accordance with an illustrative embodiment.

FIG. 3 is a block diagram of a virtual world query response system for generating customized virtual world query responses in accordance with an illustrative embodiment. Virtual world query response system 300 is a dynamic virtual world construction system for generating a customized virtual world in response to a query. Virtual world query response system 300 may be deployed to populate the virtual worlds that are returned to the users as the responses to the user's virtual world queries. Virtual world query response system 300 may be implemented on any type of data processing system, such as, without limitation, data processing system 100 in FIG. 1 or data processing system 200 in FIG. 2.

Client 302 is a data processing system associated with a user. Client 302 may be implemented using any type of computing device, such as, without limitation, client 110 in FIG. 1 or data processing system 200 in FIG. 2. Client 302 may be a desktop computer, a laptop computer, a smart phone, a personal digital assistant (PDA), a tablet computing device, or any other type of computing device. A user interacts with virtual world query response system 300 via client 302. In this example, but without limitation, the user may be interacting with an immersive virtual world environment displayed on client 302.

Query 304 is a virtual world query requesting virtual worlds of potential interest to the user. In other words, in this example, but without limitation, query 304 requests entry points to virtual world(s) having content associated with a subject, name, key word, date, tag, or other criteria. As used herein, an entry point is a location within a virtual world. An exemplary entry point may be, without limitation, "//SLurl-.com/secondlife/Here/54/105/47", Query 304 may be, without limitation, a textual string message, a uniform resource locator (URL) style string, an extended markup language (XML) style document, a pre-defined query, or any other type of query. A textual query may be a text string containing one or more letters, numbers, symbols, terms, and/or phrases. A URL style string may be any type of URL, for example, but without limitation, "server/query?t=old+masters&rl=G&rh=MA". An XML query document may contain additional information pertaining to the query, such as, but without limitation, a preference tag, a group identifier, or other information.

A pre-defined query is a query that is wholly or partially pre-generated, such as, without limitation, a canned query selected from a pre-generated set of queries. The term "set" refers to a null set having none, as well as a set having one or more, unless defined otherwise herein.

Pre-defined queries may be, without limitation, stored at client 302, on a server, or on any type of data storage device. A pre-defined query may be created by the user, by a programmer or by any other third party for utilization by the user at client 302.

The user may select one or more predefined queries from a set of predefined queries using any type of input device, such as, but without limitation, a mouse, a keyboard, a touch screen, a voice recognition system, a controller, or any other type of input device that is currently available or that may become available in the future. The set of predefined queries may include no queries, a single predefined query, as well as two or more predefined queries.

Thus, the user may generate an original query, select a pre-defined query from a set of queries, combine two or more pre-defined queries, and/or modify one or more pre-defined queries to form query 304. The user may optionally generate query 304 while interacting with a virtual world at client 302. This includes queries embedded within or generated by objects within customized virtual world 305 the user is interacting with at Client 302.

Customized virtual world 305 in this example, but without limitation, is a virtual world having set of portals 306. Each portal in set of portals 306 is a representation of an entry point to another virtual world. Each portal in customized virtual world 305 leads to a virtual world that is responsive to query 304. In other words, if query 304 requests virtual worlds about singers, each portal in customized virtual world 305 leads to a location in a virtual world having content associated with music, such as, but without limitation, a country music virtual world, a classical music virtual world, or any other type of virtual world associated with music related content, subject matter, or keywords.

Query 304 may include target style 308. Target style 308 is a user selected style for entity representations, such as, without limitation, a style for a portal representation. Target style 308 guides the selection of a default representation and/or preferred representation for objects and portals in customized virtual world 305.

In other words, target style 308 identifies a type of template or design to be used for representations of portals, objects, and/or avatars in customized virtual world 305 that is returned to the user in response to query 304. An avatar is a virtual world representation of a user. An object may be anything in the virtual world, such as a representation of a building, a street, a sign, an advertisement, or anything else in the virtual world that is not an avatar.

Target style 308 may be any type of style for rendering customized virtual world 305. A style may be, for example and without limitation, a shopping mall, urban center, subway, city street, piazza, rural town, farm, ranch, old west town, icy waste, snow, mountain, snowy mountain, winter lodge, rock climbing, winter forest, summer forest, spring forest, autumn forest, jungle, veldt, prairie, underwater, scuba diving, island, ship wreck, boat, cruise ship, canal, river walk, lake, beach, castle, space station, starship, alien planet, or any other type of style customized virtual world 305.

Query 304 may optionally include rating 310. Rating 310 is a value indicating a world rating. Rating 310 may be, without limitation, a user selected rating, a pre-defined rating, or a default rating. A rating may be any type of rating, such as, but without limitation, a general (G) rating, a parental guidance (PG) or (PG-13) rating, a restricted (R) rating, a mature audience (MA) rating, rated "K" for kid friendly, rated "T" for teen, rated by age of the user, or any other type of rating.

Rating 310 may be a rating for a particular query, a rating for a particular user, a rating for a particular client computing device, or a rating for a particular server. Rating 310 may be applicable to the content of customized virtual world 305 and/or the representations of entities, such as, without limitation, portals, avatars, and other objects in customized virtual world 305.

In this embodiment, rating 310 is associated with query 304. Rating 310 is applicable only to customized virtual world 305 returned in response to query 304. Thus, if query 304 has a G rating, the G rating only applies to the content of customized virtual world 305. A different query sent by the user from client 302 may be given a different rating, such as an MA rating to permit higher rated content to be returned to client 302 in a different customized virtual world.

In another example, rating 310 may be a rating associated with a particular user. The rating may be applicable to any query sent by that user, regardless of what rating the user does or does not select. For example, a parent may set a G rating for a preschool aged user and a PG rating for a teenage user. Any query identified with the preschool aged user would automatically be associated with the G rating regardless of the query, style, or rating selected by the preschool aged user. If query 304 is sent by the preschool aged user, customized virtual world 305 returned in response to query 304 is given the G rating regardless of any rating selected or not selected by the preschool aged user. Any query identified with the teenage user would automatically permit a selected rating of G or PG, but no rating higher than PG.

In still another example, rating 310 may be associated with a particular computing device. For example, if client 302 is a preschool aged user's computer, client 302 may be assigned a G rating for all queries sent by client 302. In such a case, any query sent from client 302 is automatically assigned the G rating. Thus, any customized virtual world returned to client 302 in this example is constructed with content appropriate to the G rating regardless of the query, style, or rating the user may request.

Query 304 may optionally include group identifier 312. Group identifier 312 is a tag or marker identifying users in a group of users. If a user wants to be sent to the same customized virtual world as one or more other users, the user may include the group identifier for that group in query 304.

Client 302 sends query 304 to query server 314 in set of servers 316. Set of servers 316 is a set of one or more servers, such as, but without limitation, query server 314, shard server 318, and/or construction server 320. Set of servers 316 may contain a single query server, as well as two or more query servers. Set of servers 316 may be located on a single physical computing device.

In another embodiment, set of servers 316 may also optionally include one or more servers located at different physical locations that are capable of sending and receiving data over a network connection, such as the Internet, an Ethernet, or any other type of network. Thus, all the servers in set of servers 316 may be at the same location as query server 314. Likewise, one or more servers in set of servers 316 may be located at one or more different remote locations from query server 314.

In this embodiment, a separate server in set of servers 316 performs the role of a query server, a shard server, and construction server. However, in another embodiment, query server 314, shard server 318, and construction server 320 may be embodied on a single server device, as well as embodied on two or more separate server devices. In yet another embodiment, a virtual machine within shard server 318 runs a query server program to perform the functions of query server 314 rather than running a custom shard program.

Query server 314 is a server that directs users to shard servers hosting virtual worlds that are responsive to their queries. The responsive shard may be an existing shard, an updated shard, or a newly constructed shard. If an existing shard having content that is responsive to query 304 does not exist, query server 314 constructs custom virtual world on a free shard by populating the free shard with virtual world content that is responsive to query 304.

Shard server 318 is a server hosting one or more shards. Shard server 318 manages and/or controls shards hosted on shard server 318. Shard server 318 mediates interactions between users and shards supported on shard server 318.

Query server 314 queries virtual world database 322 to locate virtual world entry points responsive to query 304. Virtual world database 322 is a query database containing set of virtual world entries 324. An entry in virtual world database 322, such as virtual world entry 326 describes a virtual world. In this example, virtual world entry 326 includes a set of preferred representations, descriptive data, and a set of entry points. Each entry in virtual world database 322 may specify a different preferred representation for each style in set of user selected styles 309.

Descriptive data may include at least one of a name, descriptive text, a description of the virtual world content, subject matter, and/or a set of tags. As used herein, the term "at least one of" followed by a list of items means that different combinations of one or more of the items may be used and only one of each item in the list may be needed. For example, "at least one of item A, item B, and item C" may include, for example and without limitation, item A only, item C only, item A and item C, or item A and item B. This example may also include all of item A, item B, and item C. Thus, descriptive data may include, without limitation, only a set of tags, include a subject matter and a set of tags, or include all of a name, descriptive text, a description of the virtual world content, subject matter, and the set of tags.

Virtual world database 322 comprises at least one entry point for each virtual world identified in virtual world database 322. In other words, virtual world database 322 contains one or more different entry points for one or more different virtual worlds. Virtual world database 322 may contain a single entry point or contain thousands of entry points for a plurality of different virtual worlds. Each entry in virtual world database 322 for a virtual world entry point is accompanied by descriptive data for that portion or location of the virtual world associated with the entry point.

For example, virtual world database 322 may contain an entry for a virtual world museum that mirrors the "bricks and mortar" real world version of the museum. This museum virtual world may have multiple entry points such as, but without limitation, an entry point for "main entrance: a meeting place"; an entry point for "first gallery: old masters"; an entry point for "second gallery: impressionists"; an entry point for "courtyard: modern sculpture", and so forth.

The virtual world database entry for the museum virtual world in this example includes, without limitation, a brief description of the type of art found in each area of the museum associated with each entry point. The description may be, without limitation, a name, textual description, a tag, or any other type of description.

Query server 314 searches entries in virtual world database 322 to generate a set of virtual world entry points responsive to query 304. A virtual world is responsive to query 304 if, without limitation, the virtual world description, content, and/or tags associated with the virtual world correspond to search terms and/or tags in query 304.

Query server 314 selects a free shard on shard server 318 to create customized virtual world 305. A free shard is a shard that has no clients connected to the shard and/or has no virtual world content. In other words, a free shard is a shard that is not currently hosting a virtual world.

When query server 314 requires a free shard, query server 314 sends a request to shard server 318 for a free shard. Shard server makes the next free shard at the top of the stack of free shards available to query server 314 to form the selected free shard. The stack of free shards may also be referred to as a chain of free shards.

In this example, the selected free shard is hosted on shard server 318; however, the free shard may also be selected from a remote shard server located in a different physical location from query server 314. In response to query server 314 selecting a free shard, query server 314 updates an entry for the selected free shard in shard database 328 to reflect that the selected free shard is no longer free.

In this example, if there are no free shards on shard server 318 or any other local or remote shard server, and query server 314 is unable to map query 304 to a virtual world hosted on a shard already in use that is responsive to query 304, the request to query server 314 fails and no shard details are returned to client 302.

In response to selecting a free shard, query server 314 creates custom content associated with the set of entry points for virtual worlds that are responsive to query 304. Shard server 318 populates the selected free shard with the custom content to form a custom shard that will host customized virtual world 305.

Construction server 320 is a server that constructs customized virtual world 305 having set of portals 306 on the selected free shard using the custom content. In this embodiment, construction server 320 dynamically constructs customized virtual world 305 that contains a portal for each of the virtual world entry points identified in a set of responsive virtual worlds.

A portal is an object or area in customized virtual world 305 that represents an entry point to another virtual world. An avatar interacting with the portal triggers a transition to another different virtual world. In one embodiment, when a user's avatar interacts with a portal, the user may be prompted as to whether or not the user actually wishes to transition to the different virtual world represented by the portal.

Layout manager 334 assigns a position to each portal representation in customized virtual world 305. An assigned position is a set of coordinates and an orientation of an object within the customized virtual world. Layout manager 334 may assign a position to a portal based on the relevance of the portal content to the user's query or other criteria. Layout manager 334 may assign a position relative to the position of other entities, such as, avatars, objects, other portals in customized virtual world 305 and/or the entry point the user's avatar is expected to use.

In other words, portals leading to virtual worlds having content or subject matter that is very relevant to the user's query may be assigned locations in proximity to the user's avatar and/or in proximity to other highly relevant portals. Layout manager 334 may assign positions to less relevant portals that are farther away from the user's avatar and/or are out of their initial line of sight.

If layout manager 334 is adding one or more new portals to an existing customized virtual world, layout manager 334 may assign the new portal being added to a location within the customized virtual world that is near other portals having a high relevance to the user's query or assign a location to the portal that is near portals that the user has never utilized before. Layout manager 334 may also assign a portal to a location where a majority of avatars are currently located or to an area that is farther away from one or more avatars. In this manner, layout manager 334 may maintain portal clustering during updating of an existing customized virtual world.

Layout manager 334 may also select infill scenery to bridge the empty spaces between portals and objects to make customized virtual world 305 look consistent. Layout manager 334 in this embodiment, but without limitation, utilized a default infill template to create the infill scenery for customized virtual world 305.

Virtual world database 322 may contain an address of the location for a set of preferred representations for portals connecting to the given virtual world. A preferred representation is a template for generating an area within the virtual world that contains a portal associated with an entry point into a virtual world. A virtual world in the set of responsive virtual worlds for query 304 may have a preferred representation to be used as a template for generating portals connecting to that virtual world. A preferred representation for the virtual world is located on another server, such as, without limitation, the server hosting the virtual world or a server provided by an owner of the virtual world to which the portal is linked.

A set of preferred representations may contain a single representation for a single style, a single representation that may be used for two or more different user selected target styles, multiple different representations for multiple different styles, as well as two or more different representations for a single style. For example, a set of preferred representations may include a G rated representation and a PG rated representation for a "Safari" style. The set of preferred representations may also include a PG rated "snow" representation that applies to a "winter forest" style, an "icy waste" style, and a "winter lodge" style.

Thus, the set of preferred representations for a particular virtual world may have a different preferred representation for different styles. For example, the set of preferred representations for a kid's virtual world may have a toned down store-front type of preferred representation for a shopping mall style that is different than a more continental influenced preferred representation for a "piazza" style or a wintery-type preferred representation for an "icy waste" style.

A preferred representation may contain active entities, such as, without limitation, bots. The active entities for a given preferred representation may move within the virtual world near the given preferred representation. The active entities may interact with client avatars within the virtual world. For example, an active entity for a given portal may interact with an avatar for the purpose of enticing client avatars to utilize the portal to transition to the virtual world associated with the portal.

A further implementation may allow for a number of avatars to be associated with a preferred representation. When the preferred representation is instantiated for the user, one or more free avatars are selected and instantiated in the custom virtual world. The appearance of the avatars is appropriate to the preferred representation. These avatars, operated by humans, may roam the virtual world and interact with the users in the virtual world to entice them to enter the virtual world.

This embodiment using human operated avatars is capable of much more sophisticated interaction than most bots are. This may optionally be achieved with the assistance of an avatar broker server which connects a large number of potential avatar operators with virtual worlds that require avatar services. The construction server would indicate to the avatar broker that there is an opportunity for an interactive avatar presentation at a specified entry point within the virtual world (probably along with some relevance rating) and the avatar broker could connect a potential operator to it, if there was one free with the necessary training.

In this embodiment, a preferred representation for a portal, object texture, sign, and/or information objects are fully described in the preferred representation. Thus, layout manager 334 is not required to perform any dynamic editing of the preferred representation.

Layout manager 334 adapts the spatial layout of customized virtual world 305 if the size of a preferred representation is not the same as the default representation to accommodate the larger size of the preferred representation. In other words, layout manager 334 automatically adjusts the spatial layout of objects and other portals so that a portal can have as much space within the virtual world as is specified by the preferred representation. However, in other embodiments, all preferred representations may be required to be of the same size and shape.

For example, if a kid's website sends back a preferred representation of a castle the size of a city block for a link to the kid's virtual world, layout manager 334 modifies the virtual world layout so that the portal for the kid's virtual world will get that much space within customized virtual world 305, as opposed to the portal representation being squished into the standard shop front sized space used for the default representation.

When planning the layout of the virtual world, layout manager 334 may move larger preferred representations further away from the entry point in order to avoid them dominating the virtual world around the user's entry point.

Layout manger 334 will also select the location at which an avatar appears within or enters customized virtual world 305. If an avatar is being added to an already existing virtual world, layout manager 334 may move or relocate some of the already placed portal representations and/or object to create a cluster of portals that will place portals that are more relevant to query 304 closer to the entry point for the user's avatar and/or move less relevant portals farther away from the entry point for the user's avatar.

Where layout manager 334 positions portals in a cluster, layout manager 334 may place more relevant portals in locations closest to the user's avatar and/or closest to the entry point of the user's avatar. In another example, layout manager 334 may place more relevant portals closest to the avatar's line of site than the other portal representations. In one embodiment, the most relevant portal is placed in a location directly in front of the user's avatar and/or the user's field of view.

Rating manager 332 is a software component associated with construction server 320. Rating manager 332 identifies any rating associated with a query, a user, or a client, such as rating 310 in query 304. If a rating is applicable to a query response, rating manager 332 identifies a default representation or a preferred representation with the appropriate rating.

The set of preferred representations for a target style may contain alternate versions of the preferred representation for each rating level. For example, the set of preferred representations may contain a representation for a "G" rated jungle style and a slightly different representation for an "MA" rated jungle style. The alternate versions of the preferred representation for a target style allows a user to select a toned down "G" rated or "PG" rated version of a dynamic virtual world rather than a higher rated virtual world, such as an "MA" rated virtual world. If rating manager 320 is unable to identify an appropriately rated preferred representation that matches rating 310 or is lower than rating 310, construction server 320 may use a default representation in set of default representations 330 as a template for constructing customized virtual world 334.

Rating manager 332 compares the target rating to the rating for each representation in the set of preferred representations for a given entity. If a representation with the appropriate rating is not available, rating manager 332 prevents a preferred representation from being selected. Instead, construction server 320 may select a default representation.

If construction server 320 identifies a preferred representation in virtual world database 322 for a given virtual world that matches target style 308 and/or rating 310, construction server 320 constructs portals for that given virtual world using the preferred representation.

If a preferred representation for target style 308 and/or rating 310 is not found, construction server 320 constructs the portal based on a basic preferred representation. The basic preferred representation may be a representation that is used generally for any style and/or any rating where a preferred representation for the target style and/or target rating is not available.

In another embodiment, where a preferred representation for the target style and/or a target rating is not found and a basic preferred representation is not found, construction server 320 may use a default representation from set of default representations 330 for the target style and/or a parent style of the target style. A default representation is an entry point representation that may be used as a template to construct an object having a portal entry point into a different virtual world site. There may be a different default representation for each style. In another embodiment, a default representation may be used for two or more similar styles.

For example, but without limitation, a default representation for a target style of "shopping mall" may be a standard store front, which is automatically constructed from the shopping mall default template at an appropriate location within customized virtual world 305. The same "shopping mall" default style may be used for an Elvis® related portal as well as a kid's cartoon related virtual world portal.

Figure 6:
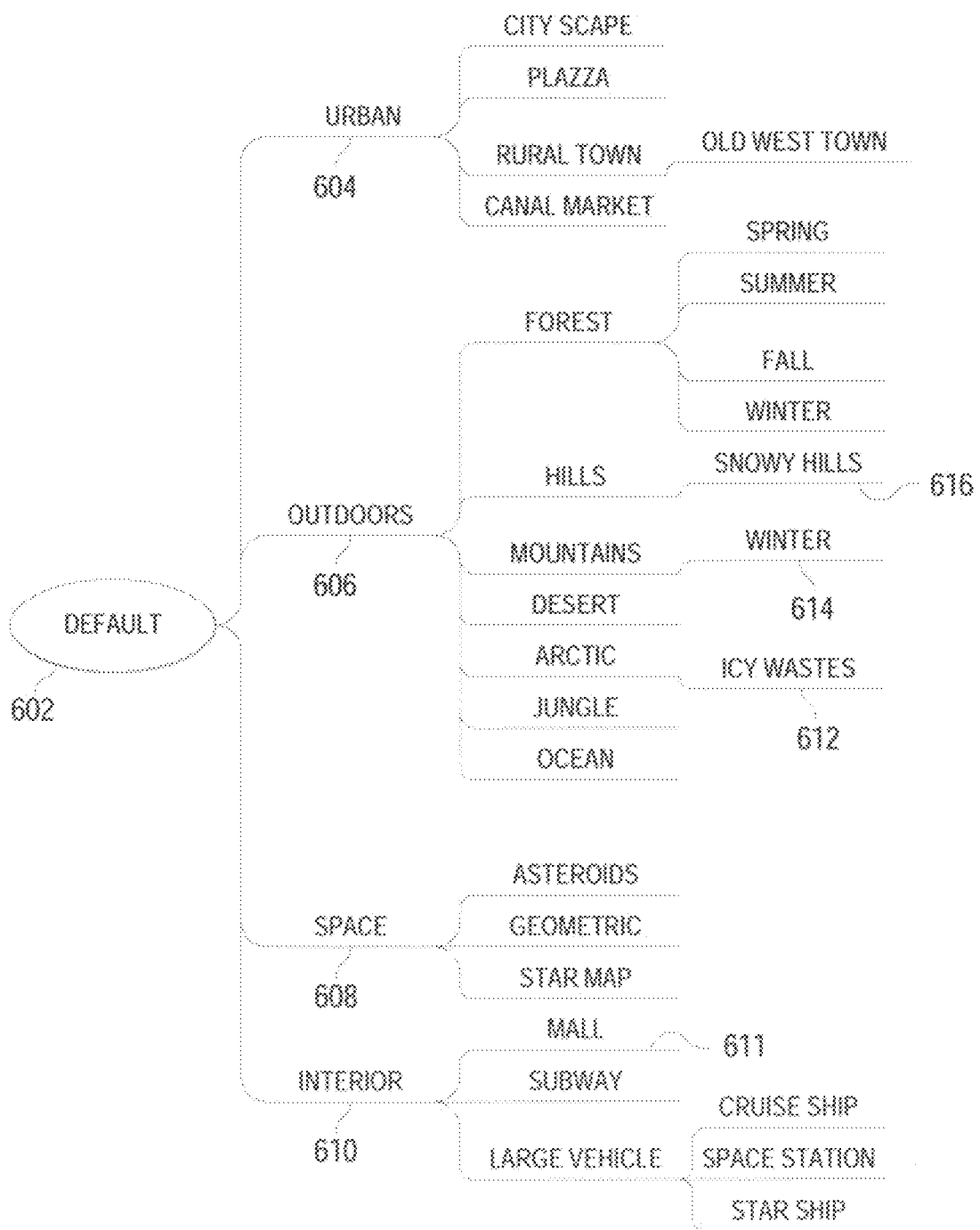
FIG. 6 is a diagram of a set of user selected styles representations in accordance with an illustrative embodiment.

In another embodiment, the preferred representation styles may be organized in a tree or graph structure, with each 'style' being derived from a parent style, as illustrated in FIG. 6 below. If a preferred representation with the specified style cannot be found, the parent style will then be used. This is then repeated as many times as necessary until a representation is found—with the ultimate 'not found' representation simply being the default store front.

In one embodiment, layout manager 334 modifies the default representation to include information specific to the virtual world associated with the portal. In other words, if the default representation is, without limitation, a generic store front, layout manager 334 in this example, but without limitation, modifies the default store front representation to contain the name of the virtual world and/or include an information object describing the subject matter and/or content of the virtual world to which the portal connects. The information object may be of any shape, including, but not limited to, a sign, a statue, a bot, or an avatar.

In another embodiment, layout manager 334 may alter the size of the default representation based on the relevance of the portal content to the user's query. For example, if a portal leads to a virtual world that is very relevant to query 304, layout manager 334 may increase the size of the default representation. Likewise, if the content associated with a portal is less relevant or less likely to be of interest to the user, layout manager 334 may use the default size or decrease the size of the default representation to reflect the importance or relevance of the portal to a particular user.

Layout manager 334 may optionally modify the default representation to include a sign, object, or texture on the default representation to contain the name of the virtual world to which the portal transitions. For example, if a portal transitions to a virtual world for a theme park, a sign on a default store front representation may be modified to include the name of the theme park or modified to include an avatar or object that says the name of the theme park virtual world.

Query server 314 returns an entry point within customized virtual world 305 on the custom shard that is responsive to query 304 to client 302. The user utilizes client 302 to interact with objects, avatars, and portals associated with customized virtual world 305 responsive to query 304.

Query server 314 optionally updates entries in shard database 314 to indicate that the selected free shard populated with the custom content to form customized virtual world 305 is now a custom shard in use. The entry for customized virtual world 305 in shard database 328 may include information describing the contents of each custom shard in use, such as, but not limited to an identification of all clients currently connected to each custom shard in use, a subject matter identification for the custom content, a rating for the content, an identification of virtual world entry points, group identifiers, a layout map for the virtual world as well as any other virtual world information.

Group identifiers for a virtual world are identified in the entries for the virtual worlds in shard database 322. The group identifier permits query server 314 to direct all clients in the group to the same custom virtual world. The group identifier permits all users in the group to navigate the same virtual world content and portals as a group.

If query server 314 receives query 304 accompanied by group identifier 312, query server 314 searches entries in shard database 328 for a custom virtual world in use that is associated with the same group identifier 312. If a custom virtual world associated with the group identifier is found, query server 308 returns an entry point of that custom virtual world associated with the group identifier to the client. If query server 314 does not locate a custom virtual world in use associated with the group identifier, then query server 314 generates a new custom virtual world responsive to query 304. Query server 314 then updates an entry in shard database 328 to identify the new custom shard with the group identifier.

In this example in FIG. 3, construction server 320 constructs customized virtual world 305. In another embodiment, construction server 320 is embodied within shard server 318. Thus, shard server 318 may construct customized virtual world 305 rather than a separate construction server.

In yet another embodiment, layout manager 334 constructs customized virtual world 305 and set of portals 306 using only set of default representations 330. Layout manager 334 edits the default representations as needed to represent each entry point in the list of entry points returned from query server 314 in response to query 304. For example, but without limitation, layout manager 334 may edit each default representation to include a name of the virtual world that the portal links to and/or a description of the content of the location in the virtual world that the avatar will arrive in via the portal.

In another embodiment, review server 344 provides a complaint mechanism for shard server 318. Review server 344 permits users to enter a complaint about a preferred representation on virtual worlds hosted by shard server 318. The complaint mechanism may be implemented by review server 344 as a client interface within the customized virtual world that permits a user to lodge a complaint associated with the representation(s) in the virtual world. The user may also be permitted to provide a reason for the complaint and/or make suggestions for improvements to the representations.

The user complaints gathered and saved by review server 344 are reviewed by appropriate technicians or other human users associated with shard server 318. An analyzer analyzes the user complains to identify unsuitable preferred representations. The analyzer may be, without limitation, a human user. The analyzer in one embodiment generates suitability indicator for a representation based on the analysis of the user complaint(s) for the representation. The suitability indicator is an indicator that indicates whether a representation is suitable for use or unsuitable for use based on the user complaints and/or user feedback associated with the representation.

An unsuitable representation is a representation having undesirable features. An undesirable feature may be, without limitation, an inaccurate rating, irritating bot, obtrusive advertising, bad spacing, a misleading name, an incorrect destination portal description, illegible text, a nonfunctioning destination portal, a nonfunctioning feature, spy ware, an inaccessible feature, style, or any other undesirable features associated with a representation.

Shard server 318 may update an entry in virtual world database 322 identifying virtual worlds that are unsuitable due to these undesirable features. If the preferred representation for a target style is identified as an unsuitable preferred representation due to one or more undesirable features, construction server 320 disregards the unsuitable representation when searching for an appropriate representation. In this example, if shard server 318 determines that the undesirable feature(s) have been removed or fixed, shard server 318 may update the entry in virtual world database 322 to indicate that the preferred representation is no longer an unsuitable preferred representation.

In another embodiment, if review server 344 gathers a number of complaints that exceeds a threshold number, a human user may review the representation subject to the complaints and determine whether to block the representation or allow the representation to be used. If the number of complaints is equal to or greater than a higher threshold number, the representation subject to the complaints may be automatically blocked from utilization by construction server 320. A human user may reclassify a representation and/or unblock a blocked representation.

In still another example, review server 344 may permit users to rank or score an entity representation and/or the destination portal to form a review ranking for the representation. This scoring function allows users to score and review virtual world. Review server 344 may make the scores and/or review ranking of a given virtual world available to avatars in customized virtual world 305 as a part of the portal representation.

In another embodiment, review server 344 may be permit users to suggest an appropriate rating for a preferred representation. A user may select an option to make a suggestion using a user interface or review server 344 may prompt the user to enter a suggested rating. Once a threshold number of rating suggestions have been received, the most popular suggested rating would be used instead of the rating provided for the preferred representation in the virtual world database. The threshold may be any type of threshold. In one example, but without limitation, the value of the threshold may be set based upon the differences between the rating claimed in the virtual world database and the one suggested by the users.

In one embodiment, a higher threshold number of user suggested rating may be required to lower a rating and a lower threshold number of user suggested ratings may be required to raise a rating. For example, but without limitation, a threshold number of only 2-3 user suggested rating reports may be required to change an original G rating provided by a preferred representation to a corrected user suggested R rating, while thirty or more user suggested rating reports may be required to change an originally claimed MA rating down to a user suggested M rating or R rating.

In another embodiment, construction server 320 updates an entry in shard database 328 with layout metadata 336 for customized virtual world 305. Layout metadata 328 is data associated with the position of portals, objects, and/or avatars in customized virtual world 305.

In this manner, virtual world query response system 300 constructs a customized virtual world with a set of portals corresponding to each entry point in the set of virtual world entry points that is responsive to a user query. Each portal leads to a location in a different virtual world that is of potential interest to the user based on the query response. The user may utilize the portals to navigate to one or more different virtual worlds of potential interest to the user from the immersion of the query response virtual world hosted on the custom shard.

Shard server 318 returns a reference entry point to customized virtual world 305 to client 302. Client connects to customized virtual world 305 having set of portals 306. Client 302 identifies set of virtual world client platforms 338. Set of virtual world client platforms 338 is a set of one or more virtual world client software platforms installed on client 302 that is permitted to launch for a given user and target rating 310. A virtual world server associated with a virtual world platform scans client 302 when it is installed and identifies various different software platforms installed on client 302 along with the software level. The virtual world server rechecks the different platforms and levels of software each time it is restarted.

Each virtual world associated with a portal in set of portals 306 may operate on a different virtual world client platform. When client 302 receives the details of each portal, client 302 checks to see of the corresponding virtual world software platform is installed on client 302. If the appropriate virtual world software platform is installed with the correct software level, the virtual world software platform is included in the set of virtual world client platforms 338.

If client 302 does not have the virtual world client software platform for a virtual world represented by a portal in set of portals 306, the user at client 302 will be unable to transition to that virtual world or interact with content in the virtual world.

Client 302 renders customized virtual world 305 having set of portals 306 on display device 340. Connection manager 342 on client 302 activates each portal in set of portals 306 associated with a virtual world client platform in set of virtual world client platforms 338 installed on client 302.

Connection manager 342 inactivates any portal in set of portals 306 that is associated with a virtual world client platform that is not installed on client 302. That is to say, connection manager 342 visually indicates to the user that the virtual world is unavailable and will not allow them to attempt to connect to it. Connection manager 342 may return detailed information, indicating the software platform that the client requires and the closest software platform the client actually has installed. For example, but without limitation, a Kid's World Live' virtual world may require a Kid's World Browser level 5.174. If a client data processing system only has Kid's World Browser level 5.098 installed, then the Kid's World Live virtual world is unavailable to the client data processing system due to the unavailability of the correct virtual world client platform.

In one embodiment, connection manager 342 receives a list of the portals in set of portals 306 and filters the list of portals against the list of available software platforms in set of virtual world client platforms 338. Connection manager 342 may send queries to review server 344 requesting an identification of portals that are still active. Connection manager 342 uses the rating, scores, and other information sent by rating manager 344 to determine which portals will be active and which portals in set of portals 306 will be inactive. When rendering an inactive portal, connection manager 342 may optionally provide a warning or notice to avatars as to why a given portal is inactive.

Client 302 renders customized virtual world with set of portals 306 on display device 340 as a user's avatar moves about the virtual world. When the client actually needs to render the portal, it will look to see whether it is active or inactive and render it appropriately.

Connection manager 342 may inactivate any portal that has been given a low score or low ranking by other users due to undesirable features of the portal representation and/or the destination portal functionality and content. Connection manager 342 may alternatively present a warning to the avatar before permitting the avatar to pass through the undesirable portal. For example, connection manager 342 may insert a warning into a portal representation that says, without limitation, "Warning: Feedback from other users indicates that the virtual world beyond this portal is not accurately represented by the structures around the portal. Do you still wish to enter it?" In another example, a warning may say, without limitation, "Warning: User feedback indicates the rating for the world beyond this portal should be R—as this is higher than your permitted PG rating, you are not permitted to pass through it".

In another embodiment, construction server 320 does not include portals that have been given a low score, low ranking or negative user feedback in customized virtual world 305. In this example, the representations associated with the undesirable portals are never built or incorporated into customized virtual world 305.

In one embodiment, shard server 318 sends the details for rendering a given portal to the client as the user's avatar approaches the given portal. In this embodiment, portals may be rendered without querying review server 344 and/or waiting for a response from review server 344. In this example, portals may only be inactivated when the virtual world client software is not available for a given destination portal.

Virtual world query response system 300 in FIG. 3 is described as a system for generating a customized virtual world in response to a query. However, the embodiments are not limited to generating a customized virtual world in response to virtual world queries. The embodiments may also be implemented to dynamically generate any customized virtual world having a set of entities regardless of whether the entities are associated with a response to a virtual world query. Moreover, the set of entities is not limited to a set of entities that includes a set of portals. In other words, the embodiments may be utilized to generate a customized virtual world having a set of entities that does not include any portal representations.

Figure 4:
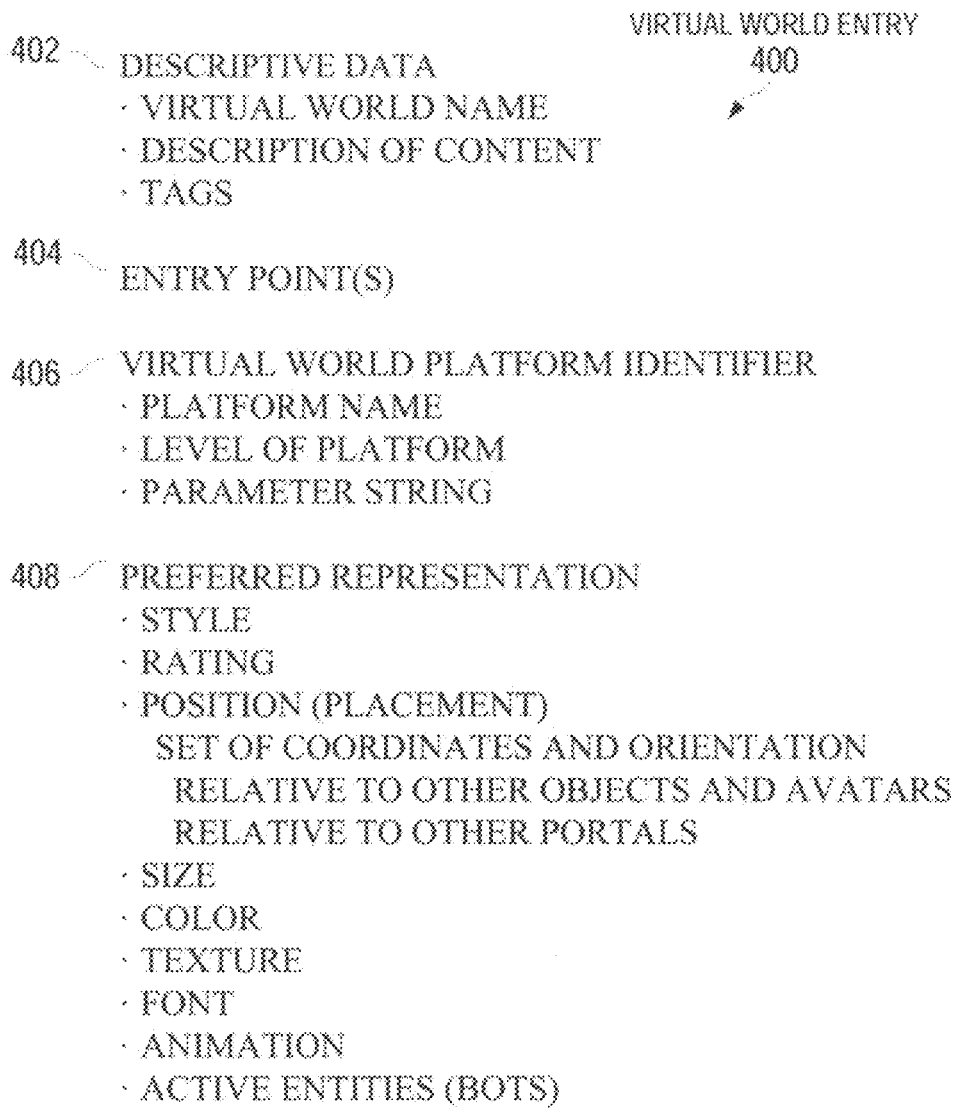
FIG. 4 is a diagram of a virtual world entry in accordance with an illustrative embodiment.

FIG. 4 is a diagram of a virtual world entry in accordance with an illustrative embodiment. Virtual world entry 400 is an entry in exemplary entry in a database, such as virtual world database 318 in FIG. 3.

Descriptive Data 402 is data in a virtual world database describing a virtual world. Descriptive data 402 may include, without limitation, at least one of a virtual world name, a description of content of the virtual world, and/or a set of descriptive tags.

Entry point(s) 404 is a set of entry points into the virtual world associated with virtual world database entry 400. Set of entry point(s) 404 may include a single entry point, as well as one or more entry points for a given virtual world.

Virtual world platform identifier 406 is data describing a virtual world client platform. Virtual world platform identifier 406 may include, without limitation, at least one of a platform name, a level of the platform, and/or a parameter string. The level of the platform may be one or more expressions comparing the level of the software, such as, without limitation, "NeverWinterNights: level==1.69". The parameter string launches the software platform to connect to the world. A parameter string may be, for example, and without limitation, "-connect: hassup.demo.org-port:3465".

Preferred representation 408 contains parameters and specifications for rendering a portal for a given entry point in set of entry point(s) 404. A preferred representation may be a representation that is specific to a particular target style and/or a particular target rating. In other words, a preferred representation may only be used for G rated queries. In another example, a preferred representation may only be used for a particular target style, such as the snow style, and a PG rating.

Preferred representation 408 may specify the position or placement, size, color, texture, font and/or any other elements of a portal representation. The position of a representation, such as a portal representation, specifies the set of coordinates and/or the orientation of the representation. The position of one representation may be determined based on the position of other objects already existing in the virtual world and/or other objects being to be rendered in the virtual world. The position of a representation may also be determined based on the position of other portal representations.

Preferred representation 408 may also specify parameters for animation and/or active entities associated with a portal. For example, but without limitation, a representation may be in the shape of a bird, hot air balloon, zeppelin, airplane, flying banner, or helicopter. This flying representation may have a predefined path of movement through the sky of the virtual world or animation for turning propellers or contrails. In another embodiment, active entities may be controlled by using scripts to control movement of the entity.

Thus, preferred representation 408 may specify the look and appearance of a portal leading to a particular virtual world. For example, preferred representation 408 for a fairy tale virtual world may provide a representation template for creating a portal that looks like a fairy tale castle complete with a moat, fire breathing dragon, and a princess trapped in the tower of the castle. In another example, a preferred representation for a music related virtual world portal may provide a model for creating a portal representation that looks like a recording studio, a music performance hall, or other music related location.

In another embodiment, the details for constructing a representation may be loaded from an external site. The representation details may be indicated by any type of resource locator or address, such as, but without limitation, a uniform resource locator (URL). Thus, the template or other details for constructing the representation for a given entity in a customized virtual world may be obtained from a virtual world database entry or downloaded from an external source using a URL or other resource locator.

FIG. 5 is a diagram of a set of entries in a shard database in accordance with an illustrative embodiment. Entries 500 is a set of virtual world entries in a shard database, such as, but without limitation, shard database 314 in FIG. 3. Each entry in entries 500 contains information associated with a customized virtual world web site generated in response to a virtual world query.

Information in an entry in entries 500 may include, without limitation, an address of the virtual world, a subject matter of the virtual world, a description of content of areas of the virtual world, one or more entry points of the virtual world, identification of users connected to the virtual world, group identifiers associated with the virtual world, and/or any other information associated with a virtual world. Entries 500 in the shard database are updated to indicate changes in content associated with each shard, describe the nature of the content associated with each shard, identify updates to the virtual world, and/or identify one or more clients connected to or disconnecting from a shard currently in use.

In this example, entry 502 and entry 504 are entries identifying two free shards having no virtual world content or clients connected to the shard. Thus, free shard entries 502 and 504 do not contain any content description or client identification.

Entry 506 identifies a shard populated with a customized virtual world having portals representing entry points for other virtual world's that are associated with "children's world" virtual world content and a general audience (G) rating. The shard database entry optionally identifies a list of user clients that are connected to the children's virtual world custom shard, such as, but without limitation, user 1, user 2, user 3, and group 1. The client "group 1" may be a group of one or more users traversing the children's world shard content as a group.

Entry 506 also identifies, without limitation, a set of four virtual world entry points "world_ep1, world_ep2, world_ep3, and world_ep4." The four entry points may be four locations in a single virtual world or entry points for locations in two or more different virtual worlds that are responsive to the query.

Entry 508 identifies, without limitation, a customized virtual world having a mature audience (MA) rating and subject matter associated with Elvis®. Entry 508 identifies four clients connected to the shard hosting this virtual world, two groups associated with the customized Elvis® virtual world, and three entry points for locations within one or more virtual worlds associated with the MA rated virtual world content on the shard.

FIG. 6 is a tree diagram of a set of user selected styles representations in accordance with an illustrative embodiment. A user may select any type of available style for the customized virtual world. If the user does not select a style, the construction server may utilize default style 602 as the target style. Default style 602 provides a basic style template for generating portal representations. Default style 602 may be modified to add preferred representations to the virtual world using default style 602. In other words, regardless of whether the target style for a customized virtual world is a user selected style or a default style, one or more preferred representations for entry points may be used with the target style.

A user may select a parent style, a child style, or a style that is both a parent and a child. A parent style is a style having one or more different variations or refinements of that style as sub-styles. In other words, a parent style has one or more child styles. A parent style may be any type of style, such as, but without limitation, an urban style 604, outdoors style 606, space style 608, interior style 610, or any other parent style. A parent style may also be a child style, and a child style may also be apparent style. The ultimate parent of all styles is a default style.

If a user chooses a child style that cannot be used because of the rating or other undesirable features of the representations associated with that target style, the construction server may utilize entry point representations for the parent style or one of the other child styles having the same parent style as the user selected target style. If these are also unacceptable, it may continue trying parent styles until it hits the default style—at which point it is guaranteed to get a viable representation.

For example, if the user selected a G rated Mall 611 style for the virtual world and a site only had an M rated Mall representation but also had a G rated Interior 610 representation, then the M rated Mall representation would be rejected and the G rated Interior representation would be used in its place.

In another embodiment, if a user selects icy wastes 612 as the target style and icy wastes 612 cannot be used because the rating for entry point representations for the icy wastes 612 style is higher than the target rating, the construction server may use another child style beneath the parent style outdoors 606, such as, but without limitation, mountains-winter 614 or snowy hills 616. In other words, the construction server replaces the target style with another child style sharing the same parent as the target style.

FIG. 7 is a chart of a set of preferred representations and ratings in accordance with an illustrative embodiment. Set of preferred representations 700 is a set of representations for one or more target styles. Set of preferred representations may be a null set having no preferred representations, as well as a set having one or more preferred representations for one or more style(s).

A style may include, without limitation, snow, icy waste, mountain, winter forest, or any other style. Each style may have no preferred representations, as well as one or more preferred representations.

In this example, but without limitation, a style may have different representations for different ratings. The snow style may have a G rated representation 702 and a PG rated representation 704. The icy waste style may have a G rated representation 706, and a mature audience rated representation 708, without a PG rated representation.

A representation may also be utilized for more than a single child style having the same parent style. In this example, the snow style, icy waste style, mountain style, and winter forest style are all child styles having a common parent "Outdoor" style. Here, without limitation, the mountain style has a G rated representation 710, a PG representation 704, and a MA rated representation 712. Representation 704 is a PG rated representation for both the mountain style and the snow style.

In this example, every style has a base G rated representation that is appropriate for all users, such as representation 702, representation 706, representation 710, and representation 714. However, every style may not have a G rated representation. For example, the Icy Waste style may only have an MA rated representation.

In another embodiment, if a query states a target style but does not specify a rating, the base G rated representation for the target style may be used in the absence of a specified target rating. In another embodiment, if the query specifies a target style but does not specify a target rating, an entry for the virtual world in virtual world database may specify a preferred representation having a preferred rating should be used in the absence of a user selected target rating. For example, and without limitation, a games virtual world entry in the virtual world database may indicate that a PG rated representation 716 for the winter forest style is to be used preferentially if the user does not request a G rated representation 714.

Figure 8:
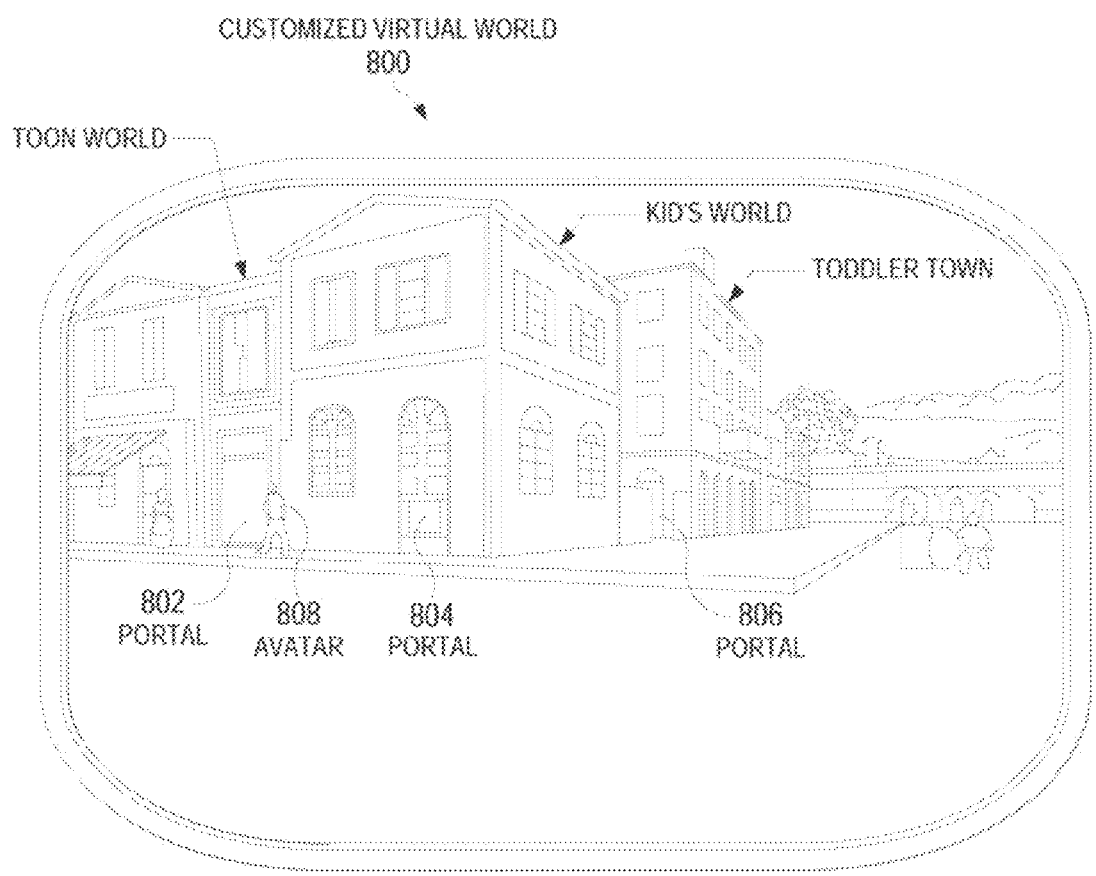
FIG. 8 is a block diagram of a customized virtual world having a set of portals in accordance with an illustrative embodiment.

FIG. 8 is a block diagram of a customized virtual world having a set of portals in accordance with an illustrative embodiment. Customized virtual world 800 is a virtual world generated in response to a virtual world query. Customized virtual world 800 includes a set of portals. The set of portals may include a single portal, as well as two or more portals. In this example, but without limitation, the set of portals includes portal 802-806. Each portal in the set of portals is an entry point into a location within a different virtual world. In other words, if a user sends the avatar representing that user through portal 802, the avatar will be taken to a location in a virtual world called "Toon World". Likewise, portal 804 leads to a location in a virtual world called "Kid's World" and portal 806 is an entry point to a virtual world referred to as "Toddler Town".

A user interacts with customized virtual world 800 and portals 802-806 using an avatar representing the user, such as avatar 808.

Figure 9:
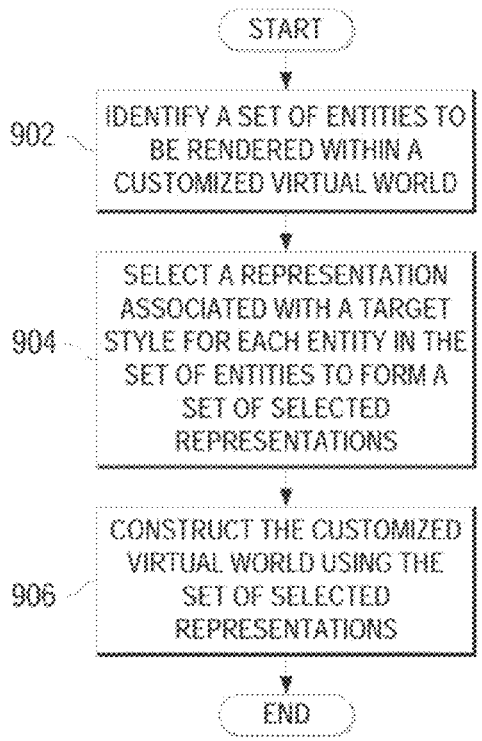
FIG. 9 is a flowchart illustrating a process for dynamically constructing a customized virtual world in accordance with an illustrative embodiment.

FIG. 9 is a flowchart illustrating a process for dynamically constructing a customized virtual world in accordance with an illustrative embodiment. The process in FIG. 9 is implemented by a software component for constructing a customized virtual world, such as, without limitation, layout manager 334 on construction server 326 in FIG. 3.

The process begins by identifying a set of entities to be rendered within a customized virtual world (step 902). The process selects a representation associated with a target style for each entity in the set of entities to form a set of selected representations (step 904). The set of entities in this embodiment may optionally include a set of portals. The process constructs the customized virtual world using the set of selected representations (step 906) with the process terminating thereafter.

Figure 10:
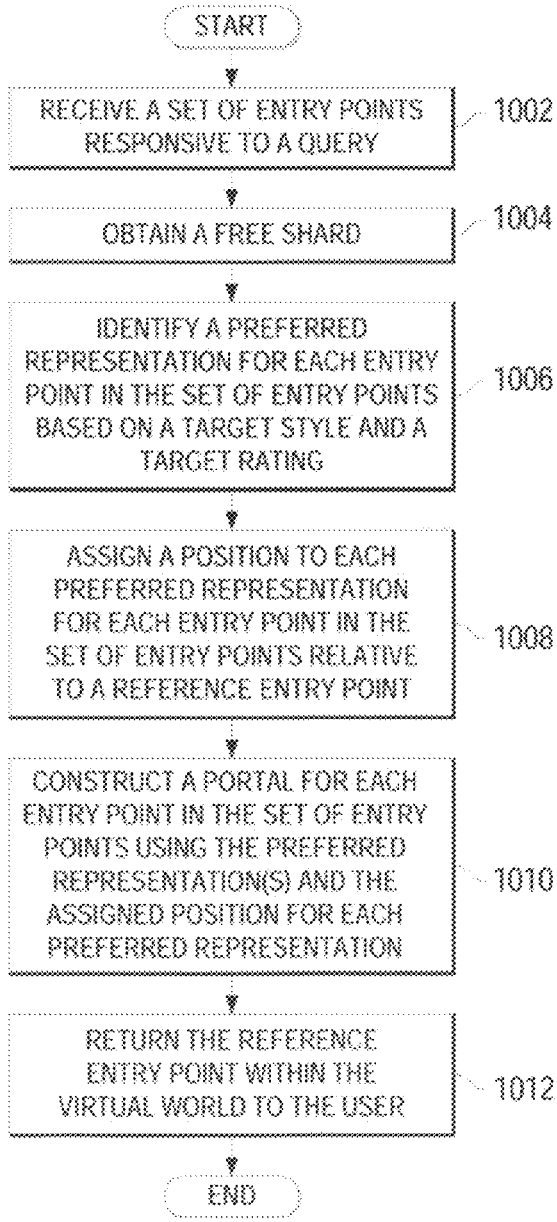
FIG. 10 is a flowchart illustrating a process for generating a customized virtual world in accordance with an illustrative embodiment.

FIG. 10 is a flowchart illustrating a process for generating a customized virtual world in accordance with an illustrative embodiment. The process in FIG. 10 is implemented by a server for generating customized virtual worlds responsive to virtual world queries, such as construction server 326 in FIG. 3. The process may also be implemented by a server for managing shards, such as shard server 322.

The process begins by receiving a set of entry points responsive to a query (step 1002). The server obtains a free shard (step 1004). The server identifies a preferred representation for each entry point in the set of entry points based on a target style and a target rating (step 1006). The server assigns a position to each preferred representation for each entry point in the set of entry points relative to a reference entry point (step 1008). The server constructs a portal for each entry point in the set of entry points using the preferred representation and the assigned position for each representation (step 1010). The server returns the reference entry point within the virtual world to the user (step 1012) with the process terminating thereafter.

Figure 11:
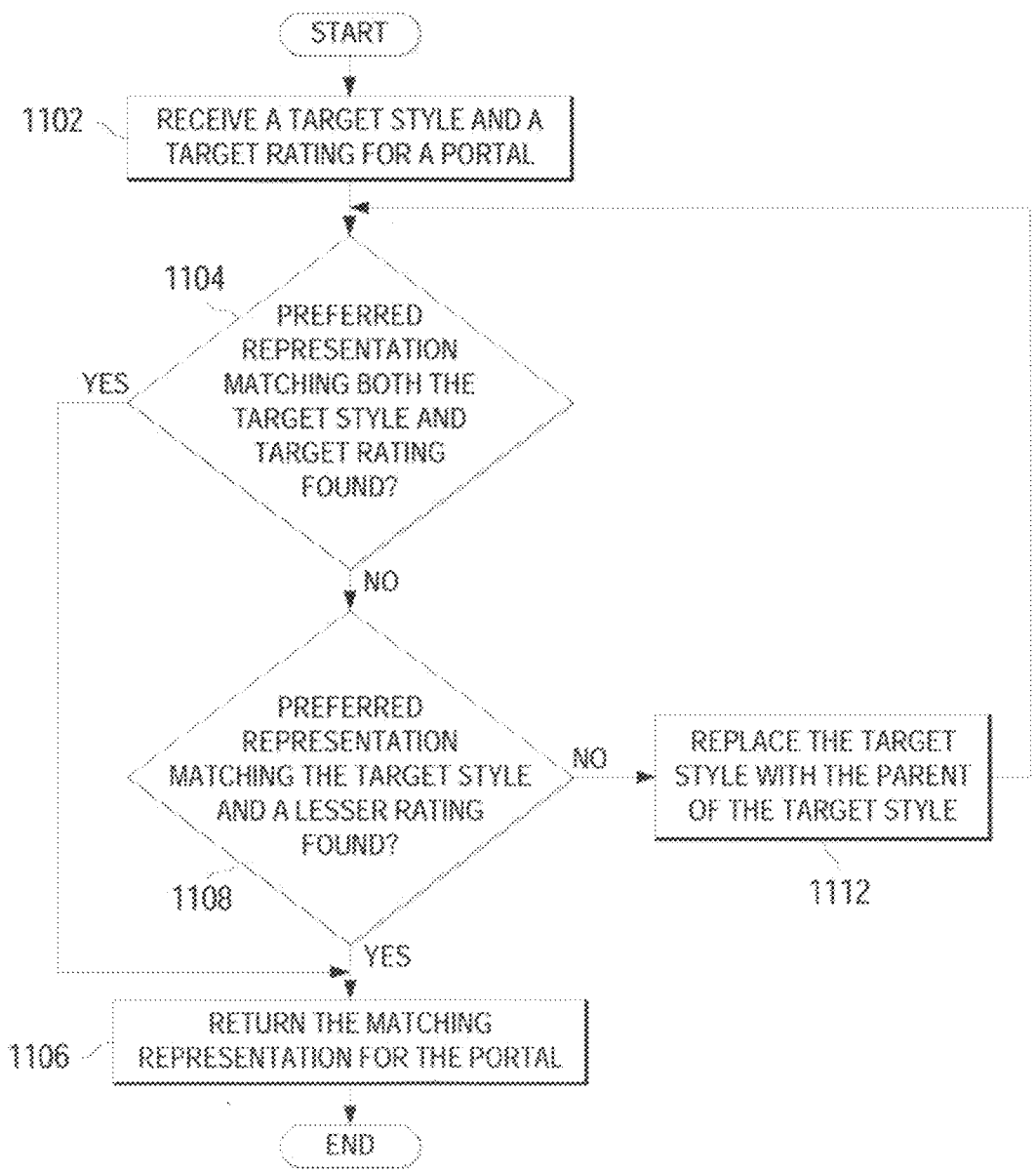
FIG. 11 is a flowchart illustrating a process for identifying a preferred representation for a portal in accordance with an illustrative embodiment.

FIG. 11 is a flowchart illustrating a process for identifying a preferred representation for a portal in accordance with an illustrative embodiment. The process in FIG. 11 is implemented by a server for generating customized virtual worlds responsive virtual world queries, such as construction server 326 in FIG. 3. The process may also be implemented by a server for managing shards, such as shard server 322.

The process begins by receiving a target style and a target rating for a portal (step 1102). The process makes a determination as to whether a preferred representation matching both the target style and the target rating is found (step 1104). If yes, the process returns the matching representation for the portal (step 1106) with the process terminating thereafter.

If a preferred representation for the target style and the target rating is not found at step 1104, the process makes a determination as to whether a preferred representation matching the target style and a rating less than the target rating is found (step 1108). If yes, the process returns that matching representation for the portal (step 1106) with the process terminating thereafter.

If a preferred representation matching the target style and a lesser rating is not found at step 1108, the process replaces the target style with the parent of the target style (step 1112) and returns to step 1004. The process iteratively executes steps 1102-1112 until a representation is found. If no preferred representation is found, a default representation may be used.

The process in FIG. 11 eventually terminates because within the structure holding the style parent information, a default style is the ultimate parent of every style, and a Default or "G" rated representation is present and may be used for any selected target style. Other structures and guaranteed terminating conditions are also possible, including, but without limitation, an embodiment in which the process utilized the default or "G" rated representation if the process fails to find both a representation and a parent style, simple utilizes the Default or "G" rated representation.

Figure 12:
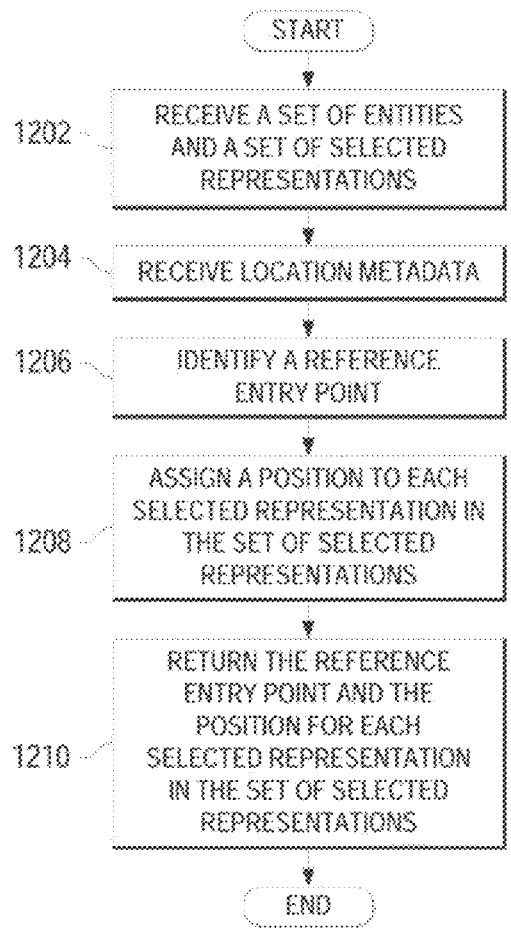
FIG. 12 is a flowchart illustrating a process for assigning a set of positions to a set of preferred representations in a customized virtual world in accordance with an illustrative embodiment.

FIG. 12 is a flowchart illustrating a process for assigning a set of positions to a set of preferred representations in a customized virtual world in accordance with an illustrative embodiment. The process in FIG. 12 is implemented by software for assigning locations to portals and other objects in a virtual universe, such as, without limitation, layout manager 334 in FIG. 3.

The process begins by receiving a set of entities and a set of selected representations (step 1202). The process receives location metadata (step 1204). The process identifies a reference entry point (step 1206). The process assigns a position to each selected representation in the set of selected representations (step 1208). The process returns the reference entry point and the position for each selected representation in the set of selected representations (step 1210) with the process terminating thereafter.

The location metadata may include, without limitation, a relevancy score, a weighting, preferential placement data, feedback from a review server, or any other data influencing the location of an entity within the virtual world. The relevancy score is an indicator generated by the query server. The relevancy score indicates how relevant a particular portal content is to the query sent by the user. For example, if a user sends a virtual world query for boating virtual worlds, an entity with a portal for a speed boating virtual world is given a higher relevancy score while a virtual world for scuba diving is given a lower relevancy score for the boating query.

The weighting is a weight that may be used with the relevancy score. The preferential placement data is optional data indicating a preference of an owner of the portal content for placement of the portal in the customized virtual world. For example, an owner of a boating related virtual world may have preferential placement data indicating that the representation for the portal associated with the boating virtual world be positioned on or near a representation of water.

In this example, the set of selected representations may include a preferred representation and/or a default representation. In one embodiment, the process assigns the position at step 1208 taking into account the relevancy score and other location metadata along with the characteristics of the preferred representations for each portal as it is placed.

FIG. 12 is a flowchart illustrating a process for clustering portals in a customized virtual world in accordance with an illustrative embodiment. The process in FIG. 12 is implemented by a server for generating a customized virtual world in response to a virtual world query, such as construction server 326 in FIG. 3. The process may also be implemented by a server for managing shards, such as shard server 322.

Figure 13:
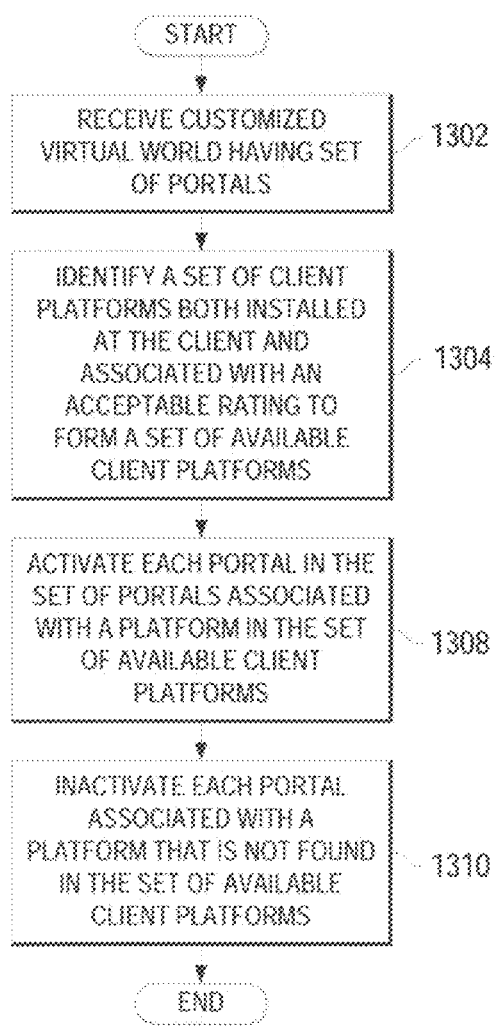
FIG. 13 is a flowchart illustrating a process for adapting a set of portals in a customized virtual world in accordance with an illustrative embodiment.

FIG. 13 is a flowchart illustrating a process for adapting a set of portals in a customized virtual world in accordance with an illustrative embodiment. The process in FIG. 13 is implemented by a client computing device, such as client 302 in FIG. 3.

The process begins by receiving a customized virtual world having a set of portals (step 1302). The process identifies a set of client platforms both installed at the client and associated with an acceptable rating to form a set of available client platforms (step 1304). The process activates each portal in the set of portals associated with a platform in the set of available client platforms (step 1308). The process inactivates each portal associated with a platform that is not found in the set of available client platforms (step 1310) with the process terminating thereafter.

Thus, the illustrative embodiments provide a computer implemented method, apparatus, and computer program product for automatically constructing a customized virtual world. In one embodiment, a set of entities to be rendered within the customized virtual world is identified. An entity is a location within the customized virtual world. A representation associated with a target style for each entity in the set of entities is selected to form a set of selected representations. A customized virtual world is constructed using the set of selected representations. The set of representations are rendered within the customized virtual world.

In another embodiment, a customized virtual world having a set of portals responsive to a query is received. A set of client virtual world software platforms installed at a data processing system associated with a user is identified to form a set of available client platforms. The customized virtual world is rendered with the set of portals. In one example, the customized virtual world is rendered on a display device of the data processing system associated with the user. Each portal in the set of portals associated with a platform in the set of available client platforms is activated. Each portal in the set of portals associated with a platform that is absent from the set of available client platforms is inactivated.

Thus, the illustrative embodiments permit a user to connect to virtual worlds that are running on different software platforms. In other worlds, the customized virtual world constructed for the user may have portals that link to multiple virtual worlds running on two or more different platform.

The virtual world construction of the illustrative embodiments may automatically construct virtual worlds from a set of constituent parts. In the example of a query server responding to a virtual world query from a user, the automated virtual world construction may be utilized to dynamically build a virtual world to hold the results of the query search. In one embodiment, the virtual worlds responsive to the query search may be running on multiple different platforms.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk, millipede storage technology, Magneto-resistive random access memory (MRAM), or phase-change memory, also known as PCM, PRAM, Ovonic Unified Memory, and Chalcogenide RAM (C-RAM). Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for generating a customized virtual world, the computer implemented comprising:
   receiving, by a query server, a query from a client computing device comprising a target style, wherein the query requests entry points to virtual worlds having content associated with at least one criterion and wherein the target style is a user selected style for portal representations;
   identifying, by the query server data processing system, a set of portals from a virtual world database to be rendered within the customized virtual world, wherein the set of portals are objects representing entry points to alternate virtual worlds that satisfy the query and wherein each portal is an entry point at a location within the customized virtual world;
   selecting, by a construction server, a representation associated with the target style for each portal in the set of portals to form a set of selected representations, wherein selecting a representation associated with the target style further comprises:
      identifying a given portal in the set of portals;
      searching a set of preferred representations associated with the given portal for a preferred representation matching the target style; and
      responsive a failure to identify a matching preferred representation for the given portal matching the target style, selecting a default representation to form the selected representation for the given portal;

constructing, by the construction server, a virtual world with the set of selected representations to form the customized virtual world, wherein the set of representations are rendered within the customized virtual world; and returning the customized virtual world to the client computing device as a response to the query.

2. The computer implemented method of claim 1 further comprising:

assigning a position to each portal in the set of portals relative to a reference entry point to form a set of assigned positions, wherein an assigned position comprises at least one of a set of coordinates and an orientation of an object within the customized virtual world; and constructing the customized virtual world using the set of selected representations and the set of assigned positions to generate a representation for each portal in the set of portals.

3. The computer implemented method of claim 1 further comprising:

clustering representations of relevant portals, wherein clustering further comprises:

receiving location metadata for each portal in the set of portals, wherein the location metadata comprises at least one of a relevance score, a weighting, and preferential position data;

retrieving a user review ranking associated with a representation for each entity in the set of portals from a review server;

assigning a position within the customized virtual world to the representation associated with the each portal in the set of portals based on the location metadata and the user review ranking to form a set of assigned positions, wherein a representation for a portal with a higher relevance to a query is assigned a position closer to an avatar associated with the user, and wherein a representation associated with a portal with a lower relevance to the query is assigned a location farther away from the avatar associated with the user; and constructing the customized virtual world using the set of selected representations and the set of assigned positions.

4. The computer implemented method of claim 1 further comprising:

querying the virtual world database for a set of virtual worlds responsive to the query;

receiving a set of entry points, wherein each entry point in the set of entry points is a predetermined location within a virtual world in the set of virtual worlds;

obtaining a free shard;

constructing the customized virtual world on the free shard; and returning a reference entry point within the customized virtual world to the client computing device.

5. The computer implemented method of claim 1 further comprising:

receiving review data associated with a given representation for a portal from a set of users;

generating a rating for the representation based on a set of user suggested ratings; and responsive to a threshold number of negative ratings for the representation, indicating that the given representation is an unsuitable representation, wherein an unsuitable representation is unavailable for utilization.

6. The computer implemented method of claim 1 further comprising:

receiving, by a client computing device, the customized virtual world having the set of portals responsive to the query;

identifying, by the client computing device, a set of client virtual world software platforms installed at a data processing system associated with a user to form a set of available client platforms;

rendering, by the client computing device, the customized virtual world with the set of portals;

activating, by the client computing device, each portal in the set of portals associated with a platform in the set of available client platforms on the client computing device; and inactivating, by the client computing device, each portal in the set of portals associated with a platform that is absent from the set of available client platforms on the client computing device.

7. The computer implemented method of claim 6 wherein identifying a set of client virtual world software platforms further comprises:

receiving, by the client computing device, a target rating for the customized virtual world; and identifying, by the client computing device, a set of client virtual world software platforms installed at a data processing system associated with the user to form the set of available client platforms, wherein each client virtual world software platforms in the set of client virtual world software platforms has a rating that is equal to or less than the target rating.

8. The computer implemented method of claim 6 further comprising:

responsive to positive review data associated with a given portal in the set of portals associated with a platform in the set of available client platforms, activating, by the client computing device, the given portal; and responsive to a threshold number of negative reviews associated with a given portal in the set of portals associated with a platform in the set of available client platforms, de-activating, by the client computing device, the given portal.

9. A computer program product for generating a customized virtual world, the computer program product comprising:

a non-transitory computer readable storage medium having computer readable program code stored thereon, the computer readable program code comprising:

computer readable program cod code configured to cause a query server to receive a query from a client computing device comprising a target style, wherein the query requests entry points to virtual worlds having content associated with at least one criterion and wherein the target style is a user selected style for portal representations;

computer readable program code configured to cause the query server to identify a set of entities from a virtual world database to be rendered within the customized virtual world, wherein the set of portals are objects representing entry points to alternate virtual worlds that satisfy the query and wherein each portal is an entry point at a location within the customized virtual world;

computer readable program code configured to cause a construction server to select a representation associated with the target style for each portal in the set of portals to form a set of selected representations, wherein selecting a representation associated with the target style further comprises:
- identifying a given portal in the set of portals;
- searching a set of preferred representations associated with the given portal for a preferred representation matching the target style; and
- responsive to a failure to identify a matching preferred representation for the given portal matching the target style, selecting a default representation to form the selected representation for the given portal;

computer readable program code configured to cause the construction server to construct a virtual world with the set of selected representations to form the customized virtual world, wherein the set of representations are rendered within the customized virtual world; and computer readable program code configured to cause the query server to return the customized virtual world to the client computing device as a response to the to the query.

10. The computer program product of claim 9 further comprising:
- computer readable program code configured to cluster representations of relevant portals, wherein the computer readable program code configured to cluster representations of relevant portals further comprises:
- computer readable program code configured to receive location metadata for each portal in the set of portals, wherein the location metadata comprises at least one of a relevance score, a weighting, and preferential position data;
- computer readable program code configured to retrieve a user review ranking for a representation associated with each portal in the set of portals from a review server;
- computer readable program code configured to assign a position within the customized virtual world to the representation associated with the each portal in the set of portals based on the location metadata and the user review ranking to form a set of assigned positions, wherein a representation for a portal with a higher relevance to a query is assigned a position closer to an avatar associated with a user, and wherein a representation for a portal with a lower relevance to the query is assigned a location farther away from the avatar associated with the user; and
- computer readable program code configured to construct the customized virtual world using the set of selected representations and the set of assigned positions.

11. The computer program product of claim 9 further comprising:
- computer readable program code configured to cause a client computing device to receive the customized virtual world having the set of portals responsive to the query;
- computer readable program code configured to cause the client computing device to identify a set of client virtual world software platforms installed at a data processing system associated with a user to form a set of available client platforms;
- computer readable program code configured to cause the client computing device to render the customized virtual world with the set of portals;
- computer readable program code configured to cause the client computing device to activate each portal in the set of portals associated with a platform in the set of available client platforms on the client computing device; and
- computer readable program code configured to cause the client computing device to inactivate each portal in the set of portals associated with a platform that is absent from the set of available client platforms on the client computing device.

12. The computer program product of claim 11 further comprising:
- computer readable program code configured to cause client computing device to receive a target rating for the customized virtual world; and
- computer readable program code configured to cause the client computing device to identify a set of client virtual world software platforms installed at a data processing system associated with the user to form the set of available client platforms, wherein each client virtual world software platforms in the set of client virtual world software platforms has a rating that is equal to or less than the target rating.

13. The computer program product of claim 11 further comprising:
- computer readable program code configured to cause the client computing device to activate a given portal associated with a platform in the set of available client platforms in response to positive review data associated with the given portal; and
- computer readable program code configured to cause the client computing device to de-activate a given portal associated with a platform in the set of available client platforms in response to a threshold number of negative reviews associated with the given portal.

14. The computer program product of claim 9 further comprising:
- computer readable program code configured to assign a position to each portal in the set of portals relative to a reference entry point to form a set of assigned positions, wherein an assigned position comprises at least one of a set of coordinates and an orientation of an object within the customized virtual world; and
- computer readable program code configured to construct the customized virtual world using the set of selected representations and the set of assigned positions to generate a representation for each portal in the set of portals.

15. The computer program product of claim 9 further comprising:
- computer readable program code configured to query the virtual world database for a set of virtual worlds responsive to the query;
- computer readable program code configured to receive a set of entry points, wherein each entry point in the set of entry points is a predetermined location within a virtual world in the set of virtual worlds;
- computer readable program code configured to obtain a free shard;
- computer readable program code configured to construct the customized virtual world on the free shard; and
- computer readable program code configured to return a reference entry point within the customized virtual world to the client computing device.

16. The computer program product of claim 9 further comprising:
- computer readable program code configured to receive review data associated with a given representation for a portal from a set of users;
- computer readable program code configured to generate a rating for the representation based on a set of user suggested ratings; and
- computer readable program code configured to indicate that the given representation is an unsuitable representation, responsive to a threshold number of negative ratings for the representation, wherein an unsuitable representation is unavailable for utilization.

17. An apparatus comprising:
a processor; and
a memory coupled to the processor, wherein the memory comprises instructions which, when executed by the processor, cause the processor to:
receive, by a query server, a query from a client computing device comprising a target style, wherein the query requests entry points to virtual worlds having content associated with at least one criterion and wherein the target style is a user selected style for portal representations;
identify, by the query server data processing system, a set of portals from a virtual world database to be rendered within the customized virtual world, wherein the set of portals are objects representing entry points to alternate virtual worlds that satisfy the query and wherein each portal is an entry point at a location within the customized virtual world;
select, by a construction server, a representation associated with the target style for each portal in the set of portals to form a set of selected representations, wherein selecting a representation associated with the target style further comprises:
identifying a given portal in the set of portals;
searching a set of preferred representations associated with the given portal for a preferred representation matching the target style; and
responsive to a failure to identify a matching preferred representation for the given portal matching the target style, selecting a default representation to form the selected representation for the given portal;
construct, by the construction server, a virtual world with the set of selected representations to form the customized virtual world, wherein the set of representations are rendered within the customized virtual world; and
return the customized virtual world to the client computing device as a response to the query.

18. The apparatus of claim 17 wherein the instructions further cause the processor to:
assign a position to each portal in the set of portals relative to a reference entry point to form a set of assigned positions, wherein an assigned position comprises at least one of a set of coordinates and an orientation a of an object within the customized virtual world; and
construct the customized virtual world using the set of selected representations and the set of assigned positions to generate a representation for each portal in the set of portals.

19. The apparatus of claim 17 wherein the instructions further cause the processor to:
cluster representations of relevant portals, wherein clustering further comprises:
receive location metadata for each portal in the set of portals, wherein the location metadata comprises at least one of a relevance score, a weighting, and preferential position data;
retrieve a user review ranking associated with a representation for each entity in the set of portals from a review server;
assign a position within the customized virtual world to the representation associated with the each portal in the set of portals based on the location metadata and the user review ranking to form a set of assigned positions, wherein a representation for a portal with a higher relevance to a query is assigned a position closer to an avatar associated with the user, and wherein a representation associated with a portal with a lower relevance to the query is assigned a location farther away from the avatar associated with the user; and
construct the customized virtual world using the set of selected representations and the set of assigned positions.

20. The apparatus of claim 17 wherein the instructions further cause the processor to:
query the virtual world database for a set of virtual worlds responsive to the query;
receive a set of entry points, wherein each entry point in the set of entry points is a predetermined location within a virtual world in the set of virtual worlds;
obtain a free shard;
construct the customized virtual world on the free shard; and
return a reference entry point within the customized virtual world to the client computing device.

21. The apparatus of claim 17 wherein the instructions further cause the processor to:
receive review data associated with a given representation for a portal from a set of users;
generate a rating for the representation based on a set of user suggested ratings; and
responsive to a threshold number of negative ratings for the representation, indicate that the given representation is an unsuitable representation, wherein an unsuitable representation is unavailable for utilization.

* * * * *